United States Patent [19]
Place, IV

[11] Patent Number: 5,844,761
[45] Date of Patent: Dec. 1, 1998

[54] DEVICE FOR CIRCUIT BOARD POWER SURGE PROTECTION SUCH AS PROTECTION OF TELECOMMUNICATION LINE CARDS FROM LIGHTNING AND POWER CROSS CONDITIONS

[76] Inventor: Oliver Rex Place, IV, 2431 11th St. NE., Hickory, N.C. 28601

[21] Appl. No.: 977,638

[22] Filed: Nov. 24, 1997

[51] Int. Cl.$^6$ .................................................. H02H 5/04
[52] U.S. Cl. ........................ 361/104; 361/117; 361/124; 361/93
[58] Field of Search ............................. 361/55, 103, 104, 361/107, 111, 112, 115, 118, 124, 125, 127, 93; 337/31, 4, 123, 139, 140, 142, 152; 379/412

[56] References Cited

U.S. PATENT DOCUMENTS

| | | |
|---|---|---|
| 2,276,184 | 3/1942 | Garrison et al. . |
| 2,548,491 | 4/1951 | Peek . |
| 3,743,993 | 7/1973 | Alley et al. . |
| 4,652,848 | 3/1987 | Hundrieser . |
| 4,661,881 | 4/1987 | Watson et al. ........................... 361/104 |
| 4,808,960 | 2/1989 | Nixon . |
| 4,821,010 | 4/1989 | Plasko . |
| 4,961,065 | 10/1990 | Taylor . |
| 4,968,962 | 11/1990 | Hohider et al. . |
| 4,973,931 | 11/1990 | Herbert ................................... 337/139 |
| 5,014,036 | 5/1991 | Komoto .................................. 337/407 |
| 5,037,670 | 8/1991 | Kuo et al. . |
| 5,084,693 | 1/1992 | Taylor et al. . |
| 5,193,044 | 3/1993 | Czerwiec ................................. 361/104 |
| 5,291,175 | 3/1994 | Ertmer et al. . |
| 5,300,914 | 4/1994 | Hartman et al. ........................ 337/249 |
| 5,621,602 | 4/1997 | Winkelmann . |

OTHER PUBLICATIONS

ALFR–2 Line Feed Resistor, IRC, Inc., Boone, NC (1992).
Secondary Protectors for Communications Circuits, IRC, Inc., Boone, NC (1992).
Surge/Power Series 755, CTS Resistor Networks, Berne, Indiana.
Microtemp® Thermal Cutoffs, Therm–O–Disc, Incorporated, Mansfield, Ohio.
Bellcore Standard TR–NWT–001089 (1989).

*Primary Examiner*—Jeffrey Gaffin
*Assistant Examiner*—Kim Huynh
*Attorney, Agent, or Firm*—Richard S. Faust

[57] ABSTRACT

A device for line card lightning and power fault protection includes a heat generating fusible resistive element connected to two electrical terminals using a controlled-melting temperature solder. The resistive element has enough thermal mass to withstand low level overcurrent conditions. The electrical terminal configuration and material are designed to thermally isolate the resistor. A spring tensioning device is included to aid in circuit disconnect when sufficient overcurrent exists to melt the resistor-to-terminal solder. The entire assembly is housed in a high temperature insulating plastic enclosure which permits installation using surface mount technology.

12 Claims, 9 Drawing Sheets

DEVICE FOR CIRCUIT BOARD POWER SURGE PROTECTION SUCH AS PROTECTION OF TELECOMMUNICATION LINE CARDS FROM LIGHTNING AND POWER CROSS CONDITIONS

FIELD OF THE INVENTION

The invention relates to circuit board power surge protection, and more particularly, to telecommunication line card or modem electronics power surge protection during abnormal power cross and lightning conditions. Specifically, the invention is a surface mountable device that addresses the protection requirements specified in the Bellcore standard TR-NWT-001089 test specification.

BACKGROUND OF THE INVENTION

Figure 1:
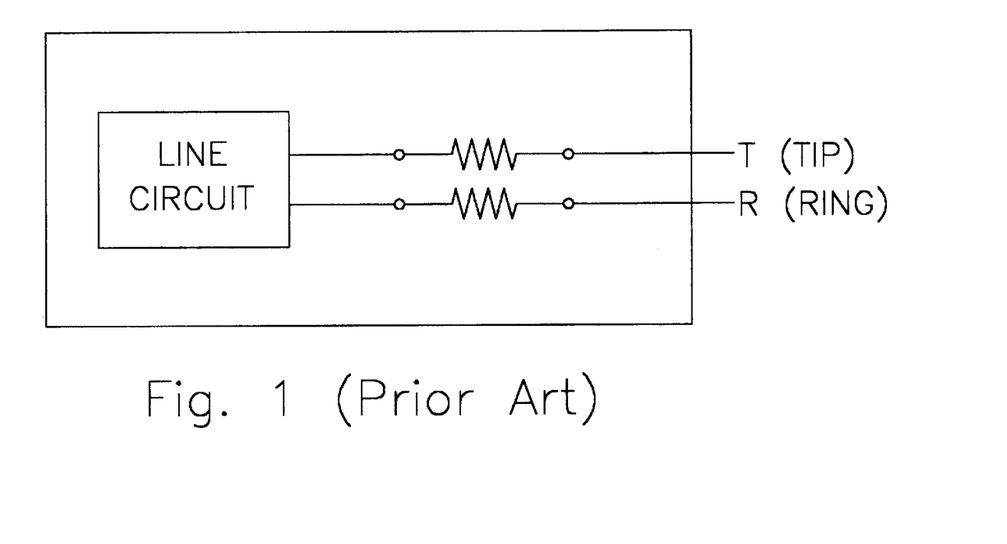
FIG. 1 is a schematic diagram which shows the conventional arrangement of a line card connected to the metallic wire pair (tip and ring). This figure illustrates the placement of the series resistors in the circuit.

Telephone line cards are connected to subscriber equipment by pairs of metallic wires called the "tip" and "ring" lines. A resistance from 5.6 ohms to 100 ohms is normally inserted in each of these lines (FIG. 1) to limit and adjust the normal line current.

In many locations, the metallic wires are suspended from utility poles between the line card site (called the central office) and the subscriber. Often, these utility poles also carry AC power lines along with the phone wires. In an abnormal event, such as when an AC power wire breaks and falls across the phone lines, the AC power lines may energize the telecommunications lines to an abnormally high level (220 to over 1000 volts, AC). This condition is known in the art as a power cross. It is essential that the line card and other equipment in the central office be protected from such an event, otherwise a heat buildup and possible fire could result.

Additionally, the metallic tip and ring wires are exposed to lightning discharges. These, too, can energize the line card circuits to dangerous levels, and the line card must be protected from such a condition.

The Bellcore TR-NWT-001089 specification sets out the requirements for line card protection against power cross and lightning events. It defines first level (lower energy) and second level (higher energy) parameters for both conditions. Essentially, the Bellcore specification, which is widely accepted for telecommunications suppliers, says that the line card (with protector) has to be undamaged and continue to operate normally after a first level power cross or lightning event, and that it must not be a fire, fragmentation, or electrical safety hazard after the application of a second level power cross or lightning event.

It has been shown that conventional fuses do not provide the needed protection because the series resistance limits the current such that a fuse will not open but will allow the overcurrent condition to occur for an extended period of time, thus causing overheating and possibly fire. Other devices which are marketed for this purpose—typically devices employing both a fuse and a resistor—have problems providing complete protection under all scenarios in the Bellcore specification.

Additionally, no line card protection device which has been offered to date is compatible with the surface mount assembly process used in modern electronics manufacturing. To date there has been extreme difficulty in transferring the current art into a surface-mount compatible device because the physical characteristics of the current art are simply difficult to convert into a surface-mountable configuration and the thermal fusing temperatures and thermal overload response times of available protection devices conflict with surface mount manufacturing techniques: The thermal fuse will fuse during the automated board assembly process of soldering the surface mount parts to the boards, and/or when in a low current fault condition the overall package will get so hot before the thermal fuse would open, it would melt the solder holding the component on the board, thus causing the part to fall off the board.

To date, no device has been able to completely satisfy the Bellcore specifications and be packaged in a manner which is compatible with the surface mount process used in the assembly of modern electronics.

SUMMARY OF THE INVENTION

The present invention provides inexpensive but complete protection of circuit boards from power surges. In a particular application, the invention serves to protect line cards from power cross and lightning conditions in a package which is compatible with modern high speed, surface mount manufacturing processes. In one preferred embodiment, the invention utilizes a single discrete electronic device—a precision, surge rated, and fusible wire-wound resistor—that is attached to plated terminals using a controlled melting point solder alloy. These terminals serve as the electrical and mechanical connections to a printed circuit board (the line card).

The fusible surge rated resistor contains enough thermal mass to allow it to readily absorb the energy present in a low level overcurrent condition without changing its characteristics. In a very high level overcurrent condition, the wire in the fusible surge rated resistor will melt and break continuity, causing the desired open-circuit condition (thereby protecting the line card from fire, fragmentation and electrical safety hazard) . In a moderate overcurrent condition, the wire will remain intact, but the resistor will become hot enough to melt the solder attaching it to the terminals. In this case, when the solder melts, the resistor is pushed away from the terminals by a spring in the device. Thus, the device will open-circuit and avoid the aforementioned hazards of fire, fragmentation and electrical safety.

As mentioned above, electrical and mechanical connections to the printed circuit board (line card) are made through the two terminals. In preferred embodiments, these terminals are designed to provide a high degree of thermal isolation between the internal resistor and the printed circuit board. This isolation prevents the heat from the soldering process from melting the resistor-to-terminal solder connection, and it reduces the heat sink effect of the printed circuit board on the internal resistor.

A primary objective of the present invention is to provide a means for protecting circuit boards (specifically line cards) from the risk of fire, fragmentation and electrical shock hazard which can result from fault conditions such as a power cross condition or lightning strike on the associated wires. Specifically, this objective is measured by the Bellcore specification identified above.

Another objective of this invention in certain preferred embodiments is to provide the protecting means in a format which is compatible with modern surface mount assembly processes.

Another objective of this invention is to provide the protecting means in an inexpensive manner.

DESCRIPTION OF THE DRAWINGS

Some of the objects having been stated, other objects will appear as the description proceeds, when taken in connection with the accompanying drawings, in which.

DETAILED DESCRIPTION OF THE INVENTION

While the present invention will be described more fully hereinafter with reference to the accompanying drawings in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 2:
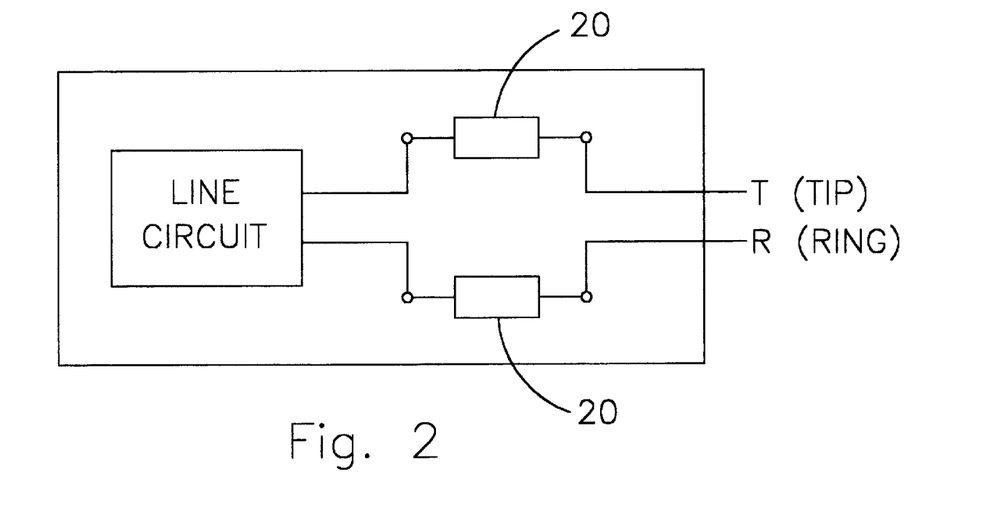
FIG. 2 is a schematic diagram of a line card which employs two line card circuit protection devices of the present invention. These devices replace the series resistors of FIG. 1 and add overcurrent protection.
Figure 3:
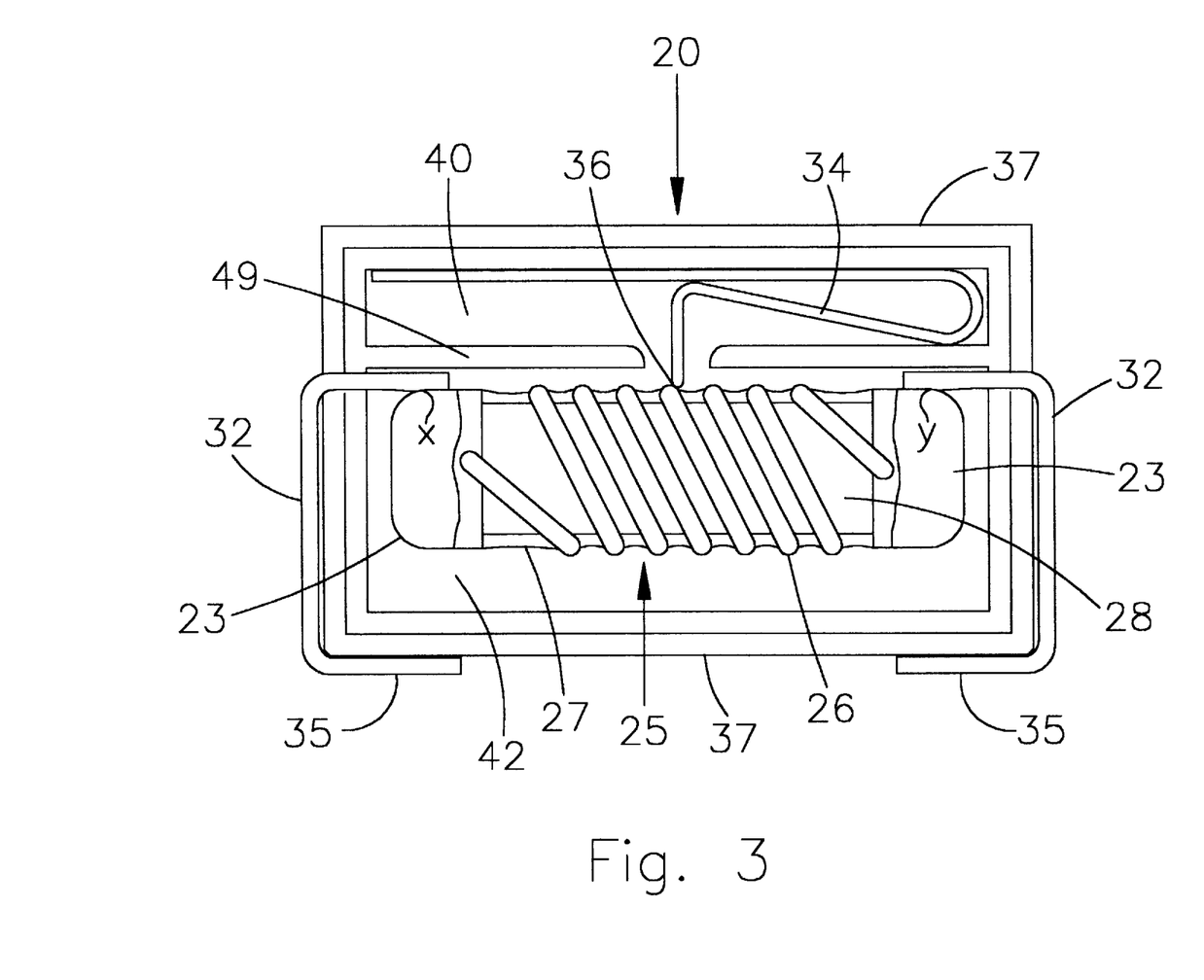
FIG. 3 is a cut-away view of one embodiment of a line card circuit protection device of the invention showing the functional components.
Figure 4A:
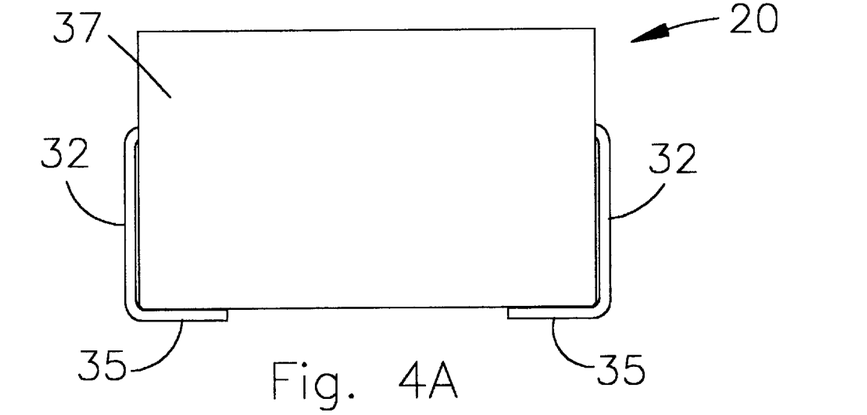
FIGS. 4A, 4B and 4C are side, bottom and end views of the device of FIG. 3.
Figure 4B:
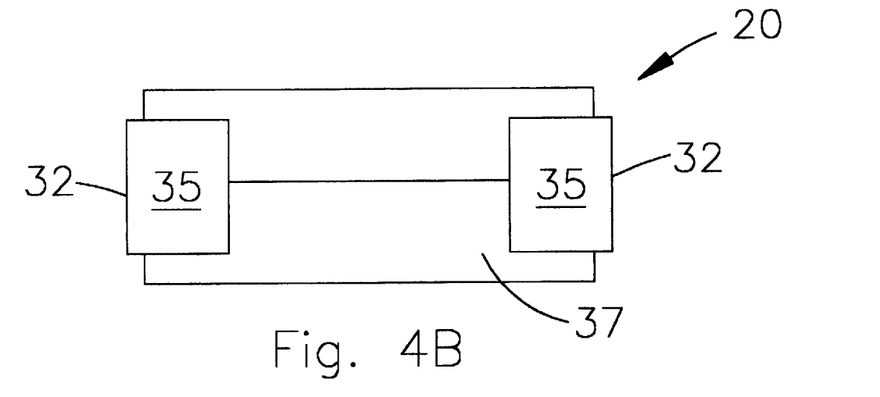
Figure 4C:
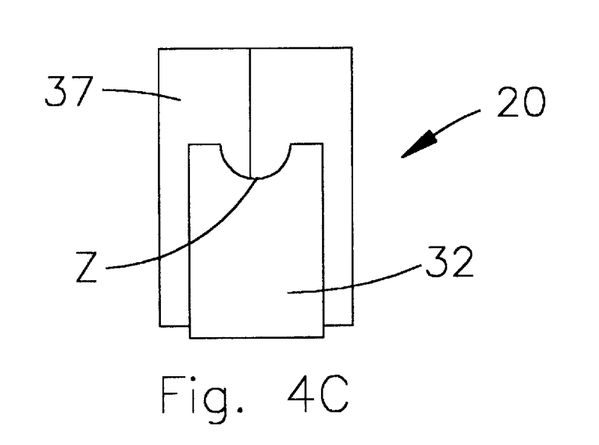
Figure 5A:
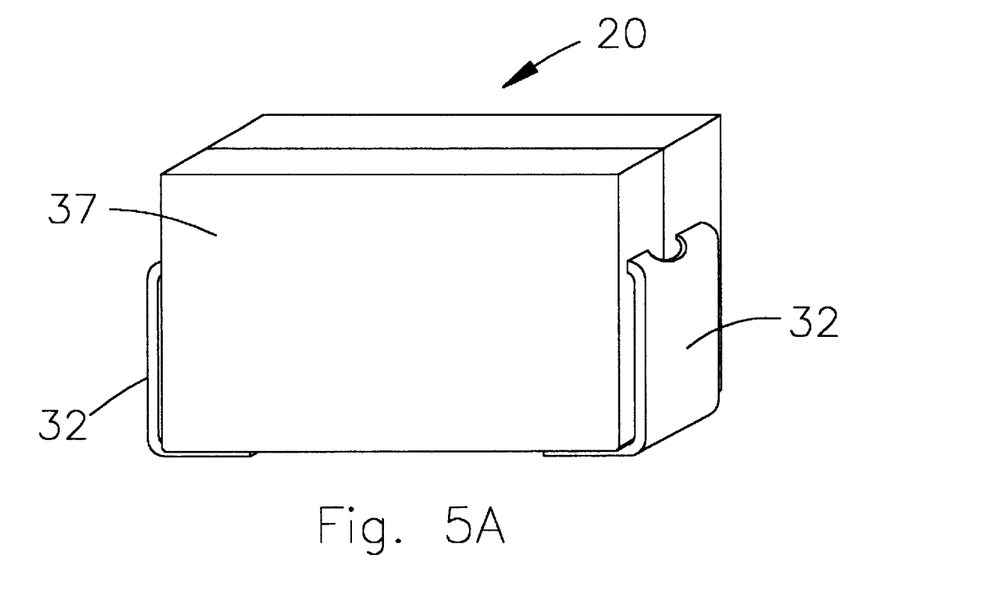
FIGS. 5A and 5B are pictorial views of the device of FIGS. 3, 4A, 4B and 4C.
Figure 5B:
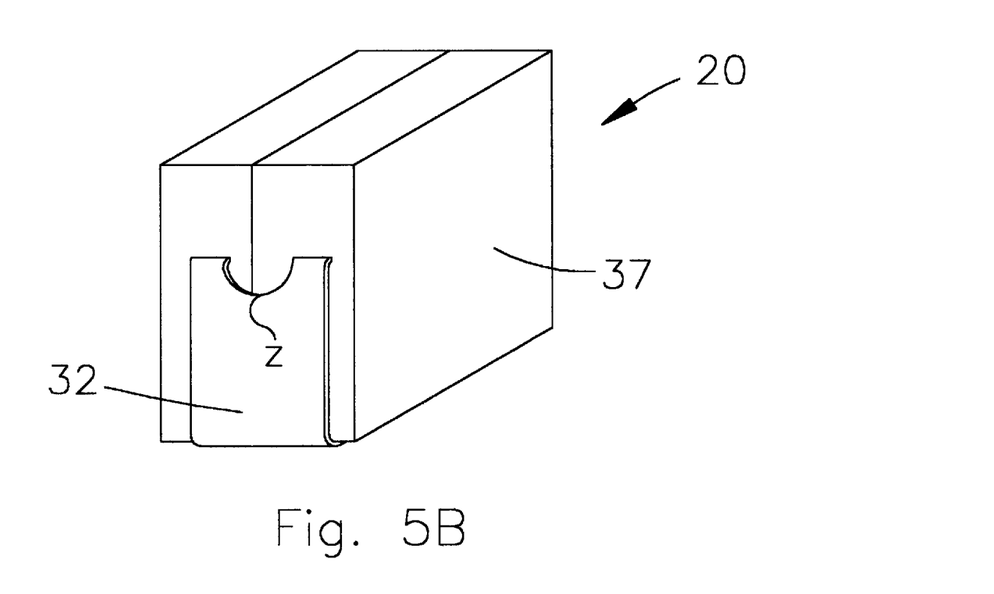
Figure 6:
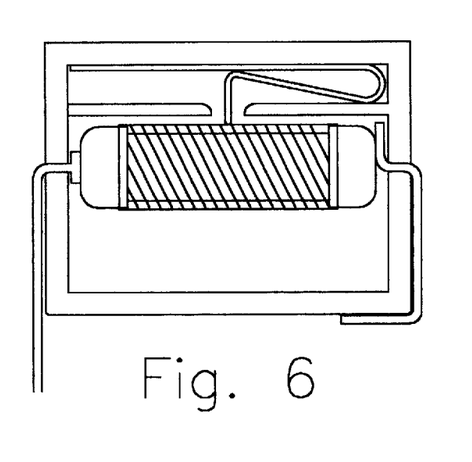
FIG. 6 illustrates an alternative embodiment of the line card circuit protection device with two other lead termination styles. The leftmost lead in FIG. 6 is a wire-type (through-hole) lead which is soldered to the end of the plated endcap; the rightmost lead is a surface mount lead (for comparison).
Figure 7:
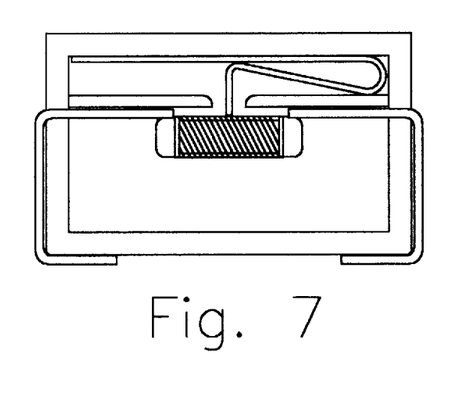
FIG. 7 illustrates another alternative embodiment showing that a physically smaller resistor can be used to decrease the fusing response time of the device; alternatively, a larger resistor will increase the fusing response time.
Figure 8:
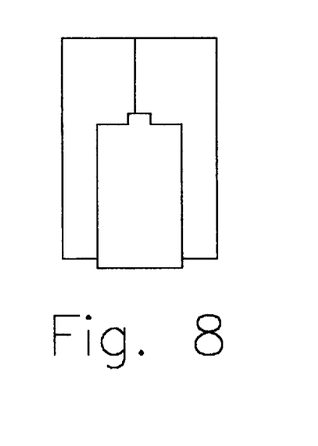
FIG. 8 illustrates an alternative embodiment of the device-to-circuit board terminal showing a modified geometry for the terminal.
Figure 9:
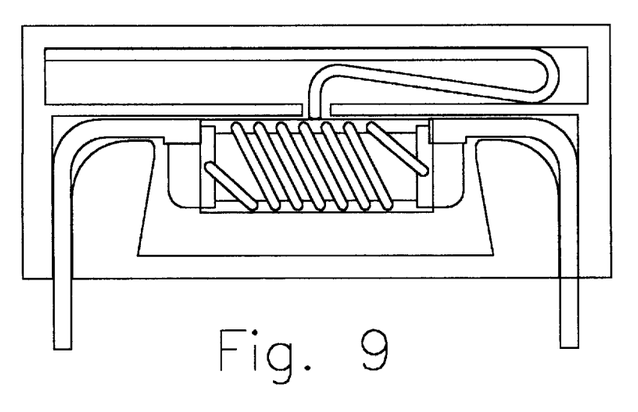
FIG. 9 depicts a longer device with two through-hole leads coming out of the bottom of the component. This device has a longer spring and has lead supports molded into the bottom; the resulting lead design has increased thermal isolation due to increased lead length and location within the enclosure. Also shown in FIG. 9 is a cup design of the terminal which facilitates the connection between the endcap and the terminal.
Figure 10:
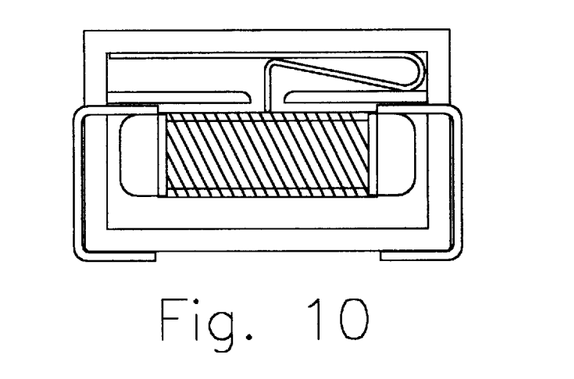
FIG. 10 shows another alternative embodiment that uses a different type of resistor such as metal film.
Figure 11:
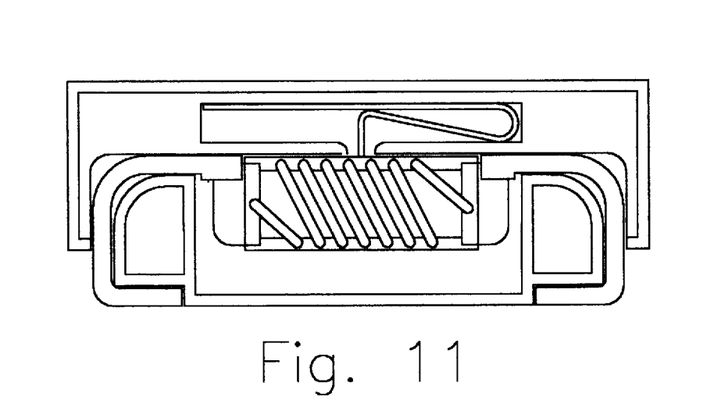
FIG. 11 depicts another surface mount implementation with leads contained within the body of the device. In addition, a shorter spring is shown along with a different terminal support design.
Figure 12:
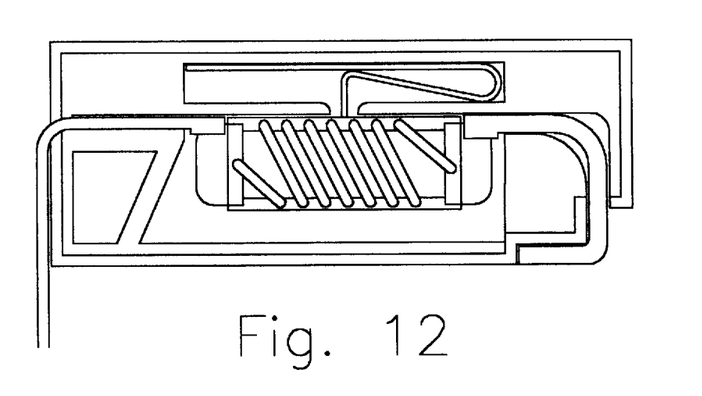
FIG. 12 illustrates two alternative terminal support designs.
Figure 13:
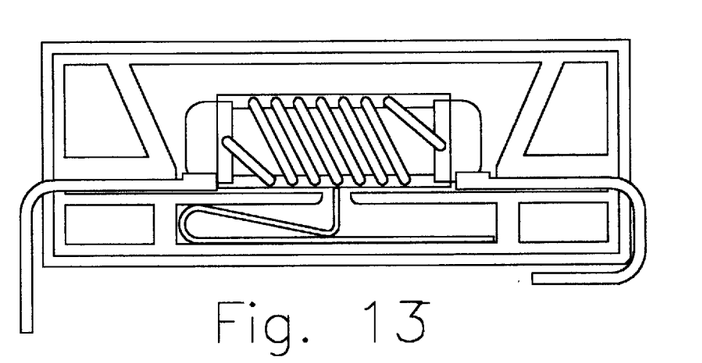
FIG. 13 shows an inverted implementation of the device of the invention where the spring pushes the resistor away from the printed circuit board as distinct from all of the embodiments in FIGS. 1–12. This drawing also illustrates both surface mount and through-hole leads.
Figure 14:
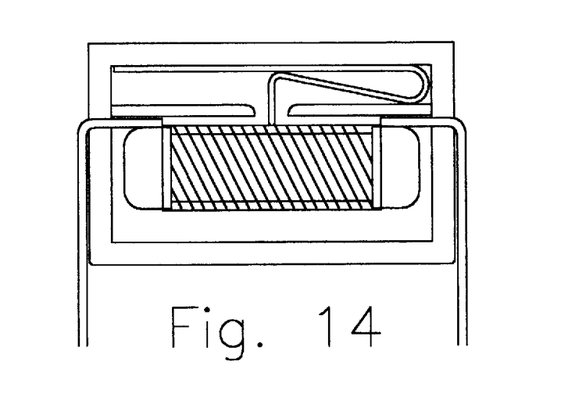
FIG. 14 shows another modified through-hole terminal.

Referring to the drawings, and particularly to FIGS. 3–5, there is shown one preferred form of a line card circuit protection device 20 constructed in accordance with the present invention. As shown in FIG. 2, two devices 20 are connected to the line circuit, one in series with the tip line and one in series with the ring line. Device 20 includes a fusible wire wound resistor 25 comprising a length of wire 26 (of a known size and alloy) wrapped around a non-conductive core 28. The detailed design of this resistive element is well known to those skilled in the art. Core 28 serves as a thermal mass which prevents device 20 from opening during short duration overcurrent conditions and the length, diameter and alloy of wire 26 are chosen to meet the resistance, surge and fusing specification of the device. Wire 26 is coated with a coating of dielectric material to aid in the fusing characteristics.

On each end of core 28 are plated metal endcaps 23 to which resistive wire 26 of resistor 25 is attached by welding. A plated ribbon terminal 32 is soldered to each metal endcap to form two fusible links X and Y. The links preferably are formed using a solder alloy of known melting point A. The lower, outwardly disposed portions 35 of terminals 32 serve as the electrical and mechanical connection between device 20 and the printed circuit board (line card).

Device 20 also contains a spring mechanism 34 which aids in disconnecting resistor 25 from terminals 32 when an overcurrent condition contains enough energy to melt one or both of the solder connections at X, Y. The spring mechanism 34 is preferably made of metal, with a dielectric coating 36 at the point where it touches resistor 25. The dielectric coating may be applied to the entire spring.

Device 20 includes a housing in the form of a high temperature insulating enclosure 37 that is preferably a two piece, snap together structure of molded plastic. In the preferred embodiment, enclosure 37 contains two chambers 40, 42. Chamber 40 houses the spring mechanism 34 and chamber 42 houses the wire wound resistor 25. The two chambers are separated by a partition 49 that keeps the spring mechanism 34 from falling onto the terminals 32 in those situations when the solder at X, Y melts. It is understood that other enclosing means may be devised by persons skilled in the art.

The design of the board-mounting terminals 32 and selection of appropriate solder melting temperatures are important for satisfactory operation of the device. In preferred embodiments, terminals 32 must be solderable both at the circuit board end and at the resistor interface. In this regard, during the board manufacturing process the board and electrical components are quickly heated above the melting point B of the surface mount solder. This causes the components to become soldered to metal pads on the board. Since this heat may penetrate inside enclosure 37 to the wire wound resistor, the solder connections at X, Y may melt if solder melting point A is less than surface mount reflow solder melting point B. Therefore, in preferred embodiments, wire wound resistor 25 is soldered to terminals 32 using a solder with a higher melting point A than the melting point B used in the component-to-circuit board surface mount assembly process. This approach presents a potential problem because it could permit device 20 to fall off of the circuit board during an overcurrent condition due to conduction of heat from resistor 25, through terminals 32, to the solder connecting terminals 32 to the board. However, given the power/time curve associated with these moderate overcurrent conditions, and a design that thermally isolates the resistor from the circuit board, this undesirable occurrence is avoided. In this regard, this thermal isolation characteristic is achieved through careful selection of the terminal material and by a terminal shape which is "necked down" in the thermal transfer path, for example, at Z (FIGS. 4C and 5B).

The mentioned thermal isolation is also important in that it prevents heat generated by the resistor in moderate overcurrent conditions—the heat necessary to melt the solder at X, Y—from being transferred to the circuit board, which could prevent the device from open-circuiting through spring 34 at the desired level.

Thus, the operation of device 20 is as follows: During normal operating conditions (no power cross or lightning), wire wound resistor 25 operates as a resistor. Power dissipation in the device is low enough that the solder joints at X, Y and wire wound resistor 25 remain intact.

In the event of a first level power cross condition (which is a low energy condition, but abnormal), wire wound resistor 25 begins to heat up. However, its core 28 and wire 26 provide enough thermal mass to absorb the additional energy for enough time to meet the Bellcore specification. Thus, wire wound resistor 25 continues being a resistor, with little or no change in its characteristics.

In the event of a second level power cross condition (which is a high energy condition), device 20 is expected to fuse to an open-circuit condition. If the overcurrent condition is very high, wire wound resistor 25 will fuse open as wire 26 effectively burns out.

In more moderate overcurrent conditions, wire 26 will remain intact (due to the wire's electro-thermal characteristics in conjunction with the thermal characteristics of the resistor core), but the solder connections at X, Y will be heated to the point of turning molten, at which time resistor 25 will be pushed away from the terminals by the spring mechanism 34. Once that happens, the current path is removed (the device is an open circuit), the heat source is removed and the solder resolidifies.

First level and second level lightning conditions are treated in a similar way to the level I power cross conditions. Namely, the thermal mass and surge characteristics of wire 26 allow device 20 to absorb the energy simulated in the lightning tests.

The protection device 20 described above may be packaged in a number of ways supporting a wide variety of current limits and manufacturing technologies.

DETAILS OF A SPECIFIC EMBODIMENT

The description will now turn to a detailed description on one particular embodiment of the invention having the general configuration and structure of device 20 discussed above. As an initial consideration, enclosure 37 preferably should be an insulator that can withstand the high temperatures encountered during fault conditions and during the board assembly process. Temperatures during surface mount soldering can exceed 220 degrees Celsius. Two plastics which meet these requirements are Liquid Crystal Polymer and PET (Rynite 530).

In this specific embodiment, the overall dimensions of the plastic enclosure 37 are 0.650" long×0.475" tall×0.275" wide. The two piece configuration comprises a cover which snaps on a main body. The main body houses the resistor, leads and spring and has a dividing barrier (partition 49) between the spring compartment and the resistor compartment. A small gap (0.60 inches wide) in the barrier wall allows the spring to directly contact the resistor. The wall is positioned inside the package so as to optimize the spring travel (approximately 0.100 inches).

The spring in this embodiment is made from a 0.18" wide by 0.003" thick ribbon of beryllium copper (#25, ½d). It could also be constructed from steel to produce a similar spring characteristic.

The resistor in the specific embodiment is a 3 watt wire wound unit specifically designed for high surge capability. The resistor wire is wound around a ceramic core (called a mandrel). The alloy and size of the wire is chosen to allow a relatively high spacing between windings, thus preventing arcing when high voltages are present. The embodiment is a 5.6 ohm device (a value typically used in the telecommunications industry) and is made from 0.0063 inch diameter copper nickel alloy (300 ohms per circular mil-foot, 45% nickel/55% copper alloy). The wire is wound around a 0.120 inch diameter mandrel (itself made of alumina ceramic).

The wire is welded to the endcaps. The endcaps are a nickel-plated steel, which provides both a surface for which to weld the wire and provides a favorable surface for soldering to the terminals.

Another key element is the dielectric coating which is applied over the windings. This coating immobilizes the coils of wire from responding to the magnetic field which results from the current produced by a lightning surge. The coating should be able to withstand high temperatures (300 degrees Celsius, minimum), 400 degrees Celsius preferred. The coating cannot become conductive or otherwise affect the electrical characteristics of the device. Silicone-type coatings are preferred because they meet these requirements. During application of the coating, care should be taken so that the coating is not applied to the endcaps.

The silicone-type coating has an added advantage of softening somewhat at high temperatures, which helps allow the resistance wire to melt through or break through the coating when severe overload conditions exist. However, the thickness of the coating has to be limited to keep it from adversely affecting the operation of the device. A thickness on the order of a few mils over the top of the wires, thus filling the voids between the wire turns, is deemed satisfactory for the purpose.

The terminals may be implemented in several manners, as shown in the drawings of alternative embodiments. However, in this specific embodiment, the terminals are made from 0.200 inch wide copper alloy ribbon. Copper alloys 42 and 194 have been found to be suitable for this application. The terminal is then plated with a solder alloy (Sn96, which is 96.5% tin and 3.5% silver, with a melting point A of 221 degrees Celsius). The solder plating is applied to the entire terminal with a thickness of 500 microinches or greater to facilitate the automated soldering process.

The Sn96 solder alloy is chosen because it has a higher melting temperature A (221° C.) than the melting point B (e.g. 200° C.) of the solder used in surface mount PC board assembly, thus preventing the internal solder from melting during solder reflow. This solder alloy also has excellent wetting characteristics, thermal fatigue resistance and joint strength.

The terminals exit from the body of the enclosure and are formed down and under the bottom of the device in a "J" shape which is commonly found in surface mount components. During board assembly, a solder paste is typically applied to the board using a stenciling technique (allowing the whole board to be "pasted" at one time). After solder paste is applied, the components are placed in the paste, and the board, components and paste are subjected to a heating process which melts the solder paste, which then cools and solidifies, connecting the component leads to the board.

The description will now turn to a description of the operation of the above-described "specific embodiment" relative to the Bellcore TR-NWT-001089 test specification. The Bellcore test is designed to simulate the vast array of conditions a telephone line card circuit protector may be subjected to, and is generally thought of as comprehensive in doing so. Therefore, reference is being made to this test specification in an effort to describe the operation of one specific embodiment of the invention. The table entitled "Summary of the Bellcore TR-NWT-001089 Test Specification", below, summarizes the most significant portions of the Bellcore test specification. The Bellcore test specification is basically divided into two types of tests: the AC power fault tests and the lightning surge tests. The two types of tests are then subdivided into two levels: first and second level. The main difference between the two levels is severity of the test and the basic criteria required of each.

Following the Bellcore test summary is a table entitled "Performance of 5.6 Ohms Specific Embodiment of the Invention Subject to Bellcore TR-NWT-001089 Test Specification". The "status" column at the end of each test outline describes the state of the device once tested. (Some additional electrical calculations are included within the outline.) The test results are that of a 5.6 ohm embodiment.

As noted, the device stays operational and within tolerance for all of the first level AC power fault, first level lightning surge, and second level lightning surge tests. During these tests the device absorbs the fault condition and continues to serve as a resistor performing the basic circuit function. It is not until it is subjected to second level AC power fault conditions that the device acts as a fuse and removes the current path. The resistor wire fuses open on all of the second level AC power fault tests except for test #4, which is intended to determine the effect of a long-term power fault event. This test is performed at 600 volts and other voltages in the range of 100 to 600 volts as necessary to produce maximum heating in circuit components, or other potential "worst case" fire hazard conditions within the component under test. During this test, the 5.6 ohm embodiment goes from an operational state and within tolerance to a disconnected state where the solder links fuse open, as the voltage is increased. The solder links will start to disconnect the current in the 4 to 5 watt load range for the specific embodiment within the allotted time period. The amount of time it takes the solder links to open decreases as the voltage applied increases.

Summary of the Bellcore TR-NWT-001089 Test Specification

First-Level AC power fault tests
(To comply with the first-level criteria, the equipment under test shall be undamaged and continue to operate properly after the stress is removed.)

| test | voltage (Vrms) | line resistance (Ohms) | duration |
|---|---|---|---|
| #1 | 50 | 150 | 15 min. |
| #2 | 100 | 600 | 15 min. |
| #3 | 200 | 600 | (60)-1 sec. |
|  | 400 | 600 | (60)-1 sec. |
|  | 600 | 600 | (60)-1 sec. |
| #4 | 1000 | 1000 | (60)-1 sec. |
| #5 | high impedance | inductive | source tests |

Second-Level AC power fault tests
(To comply with the second-level criteria, the equipment under test may sustain damage, but shall not become a fire, fragmentation, or electrical safety hazard)

| test | voltage (Vrms) | current (amps) | duration |
|---|---|---|---|
| #1 | 120 | 25.0 | 15 min. |
|  | 277 | 25.0 | 15 min. |
| #2 | 600 | 60.0 | 5 secs |
| #3 | 600 | 7.0 | 5 secs |
| #4 | 100–600 | 2.2 @ 600 v | 15 min. |
| #5 | high impedance | inductive | source tests |

2 pieces of cheesecloth wrapped tightly around device as hazard indicator for network equipment on customer premises: use MDQ 1-6/10 bussman fuse in series with EUT First-Level lightning surge tests
(To comply with the first-level criteria, the equipment under test shall be undamaged and continue to operate properly after the stress is removed.)

| test | min. peak voltage (volts) | max. rise/min. decay time (ms) | min. current (amps) | repetitions each polarity |
|---|---|---|---|---|
| #1 | +/−1000 | 10/1000 | 100 | 25 |
| #2 | +/−2500 | 2/10 | 500 | 10 |

Second-Level lightning surge tests
(To comply with the second-level criteria, the equipment under test may sustain daimage, but shall not become a fire, fragmentation, or electrical safety hazard)

| test | min. peak voltage (volts) | max. rise/min. decay time (ms) | min. current (amps) | repetitions each polarity |
|---|---|---|---|---|
| #1 | +/−5000 | 2/10 | 500 | 1 |

2 pieces of cheesecloth wrapped tightly around device as hazard indicator

PERFORMANCE OF 5.6 OHMS SPECIFIC EMBODIMENT
OF THE INVENTION SUBJECT TO
BELLCORE TR-NWT-001089 TEST SPECIFICATION 5.6 ohms First-Level AC power fault
(shall not be damaged & continue to operate)

| voltage | line resistance | volt load | watt load | I load | duration | status |
|---|---|---|---|---|---|---|
| 50 | 150 | 1.8 | 0.6 | 0.3 | 15 min | in tolerance |
| 100 | 600 | 0.9 | 0.2 | 0.2 | 15 min | in tolerance |
| 200 | 600 | 1.8 | 0.6 | 0.3 | (60)-1 sec | in tolerance |
| 400 | 600 | 3.7 | 2.4 | 0.7 | (60)-1 sec | in tolerance |
| 600 | 600 | 5.5 | 5.5 | 1.0 | (60)-1 sec | in tolerance |
| 1000 | 1000 | 5.5 | 5.5 | 1.0 | (60)-1 sec | in tolerance |

5.6 ohms Second-Level AC power fault
(shall not become fire hazard fragment, or electrical safety hazard)

| voltage | line resist | volt load | watt load | I load | duration | status |
|---|---|---|---|---|---|---|
| 120 | — | 140.0 | 3500.0 | 25.0 | 15 min | wire fuses |
| 277 | 5.48 | 140.0 | 3500.0 | 25.0 | 15 min | wire fuses |
| 600 | 4.4 | 336.0 | 20160.0 | 60.0 | 5 secs | wire fuses |
| 600 | 80.1 | 39.2 | 274.4 | 7.0 | 5 secs | wire fuses |
| 100 | 267.6 | 2.0 | 0.7 | 0.4 | 15 min | in tolerance |
| 600 ↓ | 267.6 | 12.3 | 27.1 | 2.2 | 15 min | solder link fuses |

-continued

PERFORMANCE OF 5.6 OHMS SPECIFIC EMBODIMENT
OF THE INVENTION SUBJECT TO
BELLCORE TR-NWT-001089 TEST SPECIFICATION 5.6 ohms First-Level lightning surge tests
(shall not be damaged & continue to operate)

| test | min. peak voltage (volts) | max. rise/min. decay time (ms) | min. current (amps) | repetitions each polarity | status |
|------|---------------------------|-------------------------------|---------------------|---------------------------|--------|
| #3   | +/−1000                   | 10/1000                       | 100                 | 25                        | in tolerance |
| #4   | +/−2500                   | 2/10                          | 500                 | 10                        | in tolerance |

5.6 ohms Second-Level lightning surge tests
(shall not become fire hazard, fragment, or electrical safety hazard)

| test | min. peak voltage (volts) | max. rise/min. decay time (ms) | min. current (amps) | repetitions each polarity | status |
|------|---------------------------|-------------------------------|---------------------|---------------------------|--------|
| #1   | +/−5000                   | 2/10                          | 500                 | 1                         | in tolerance |

OTHER EMBODIMENTS

Various alternative embodiments of the invention are illustrated in FIGS. 6–18, with the distinguishing features thereof being set forth above in the Description of the Drawings portion of the specification. It will be noted that while surface mounting of the devices of the invention is preferred, through-hole technology may be employed.

Figure 15:
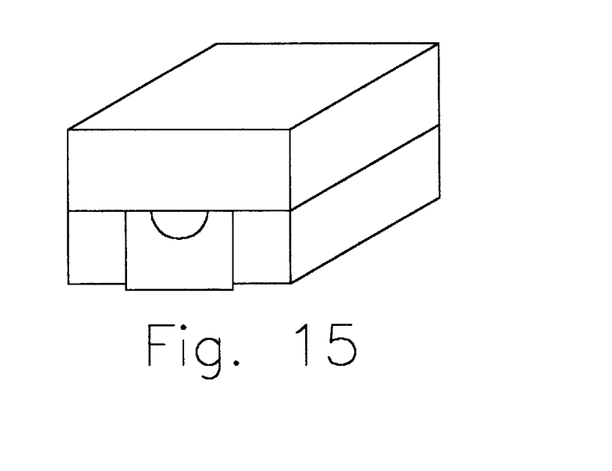
FIG. 15 is a pictorial view of an alternative embodiment wherein the terminals are rotated ninety degrees to permit the device to be attached to the circuit board in a low profile orientation.

FIG. 15 illustrates a low profile version of the current protection device wherein the terminals 32F (only one shown) are twisted ninety degrees inside the housing enclosure to allow for the configuration. In this embodiment, the device lies flat instead of in the upstanding orientation of FIG. 5B, with the spring residing next to the fuse, instead of over the fuse.

A variation (not shown) of the embodiment of FIG. 15 provides twists in the terminals on the outside of the enclosure package. Other configurations of the terminals may be used to allow the terminals to be positioned on the outside of the package enclosure at a ninety degree orientation from that of device 20 of FIGS. 3–5.

Figure 16:
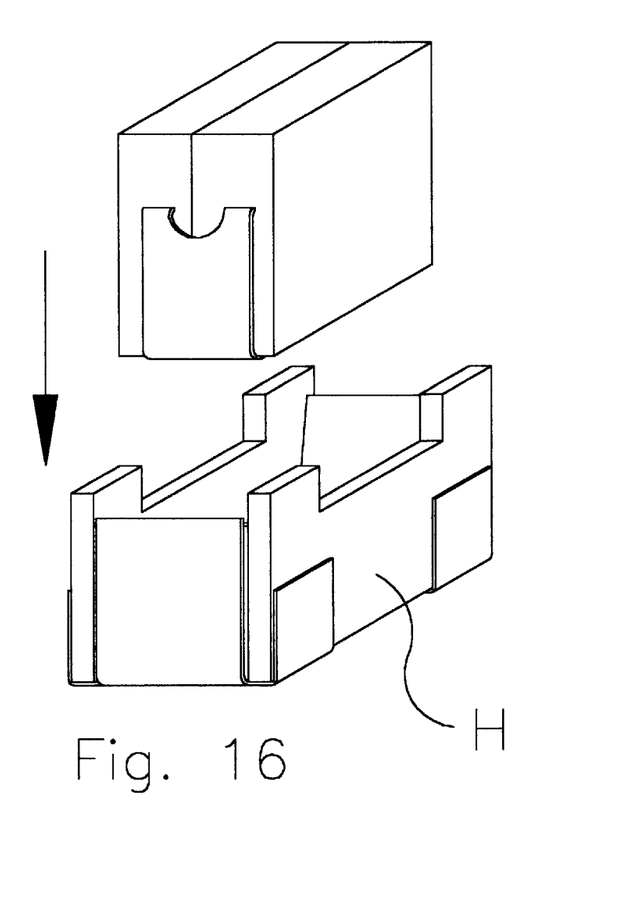
FIG. 16 illustrates the circuit protection device of FIGS. 3–5 in combination with a holder that attaches to the circuit board.

FIG. 16 illustrates the circuit protection device of FIGS. 3–5 in combination with a holder H. The holder includes terminals that are surface mountable to the circuit board so that the holder can be attached to the board in a conventional, automated surface mount operation. As shown, the protection device slides or snaps into holder H, preferably after the surface mount reflow process, which serves to mechanically and electrically connect the protection device to the circuit board and the circuit. Holder H adds several new features and capabilities to the protection device: (i) Holder H allows the protection device to be easily replaced after the protection device has fused open in an abnormal power condition, with the fused protection device simply being pulled out from holder H and a new protection device snapped into place. (ii) Holder H allows the protection device design to utilize a lower temperature fusing solder for the connecting link solder joints X, Y. This feature allows for the design of a protection device that is quicker reacting and more sensitive to overload conditions, where desired. (iii) If it is desired to make holder H for use with through-hole mounting technology, holder H will allow the protection device, manufactured in the surface mount form, to be utilized as a drop-in replacement on a through-hole design circuit board.

Figure 17:
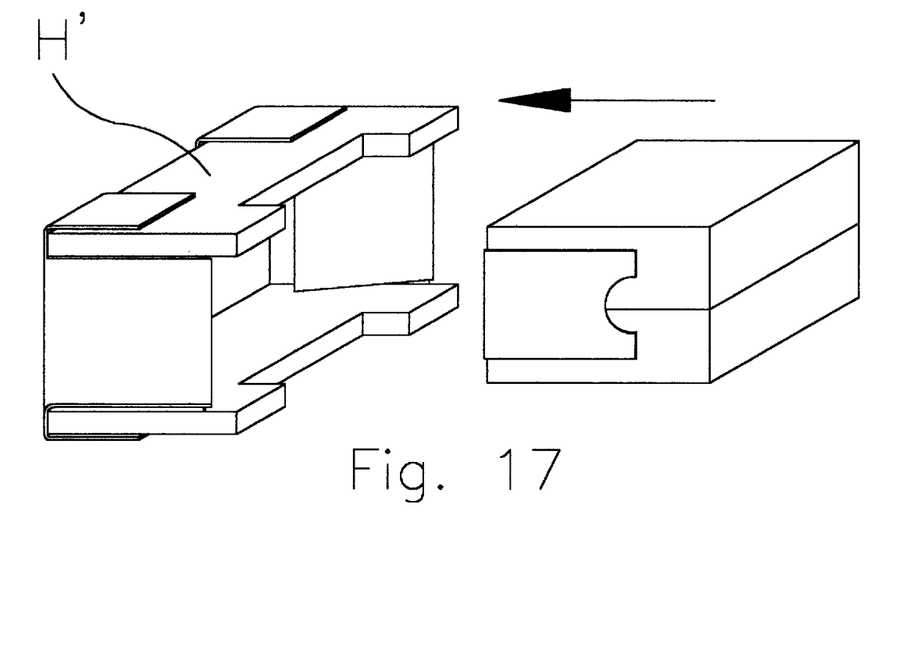
FIG. 17 illustrates the low profile device of FIG. 15 in association with a mating holder.

FIG. 17 illustrates another embodiment that includes the primary features of the embodiments of FIGS. 15 and 16. According to FIG. 17, the low profile protection device of FIG. 15 slides or snaps into a mating holder H'.

Figure 18:
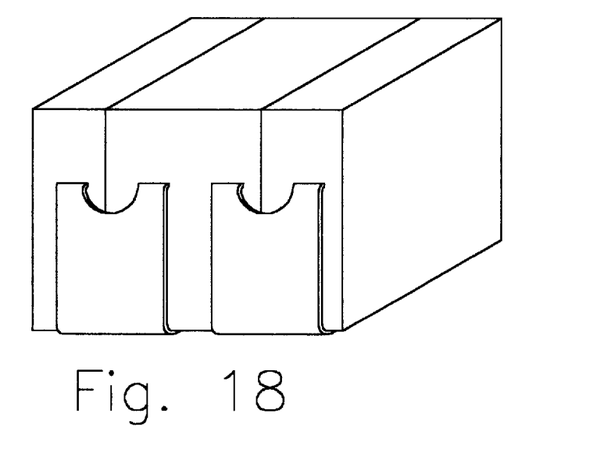
FIG. 18 illustrates a double component packaged device.

FIG. 18 illustrates a double component packaged device having a housing enclosing two complete surge protection devices of the invention.

While the invention has been described in connection with certain illustrated embodiments, it will be appreciated that modifications may be made without departing from the true spirit and scope of the invention. For example, the invention has been described primarily as a circuit protection device for a telephone line card. The invention may also be used in other circuit protection environments. For example, within the telecommunications industry circuit protection devices of the invention may be incorporated into modem boards to protect such boards and associated equipment (e.g. a computer) against power surges. More generally, devices of the invention may be incorporated into any circuit board that may experience a power surge.

That which is claimed is:

1. A device that is mountable on a circuit board for protecting the circuit board from various levels of power surge, said device comprising:

a housing;

a resistor contained within said housing;

a heat sink associated with said resistor providing a thermal mass for absorbing heat generated by said resistor;

a pair of terminals for connecting said resistor to a circuit board so that the resistor is electrically connected to receive a potential power surge, each said terminal extending through said housing so that it connects to said resistor internal of the housing and provides a surface external to the housing for adherence to a circuit board;

connecting links formed of a solder of known melting point joining said terminals to said resistor;

means for applying a force that biases said resistor away from said terminals;

said resistor having a chosen resistive value serving to function in the circuit under normal operating conditions;

said heat sink having sufficient heat absorbing and heat dissipating characteristics such that during low level power surge conditions the resistor may continue to operate without significant change to its electrical characteristics; and said connecting connecting links being responsive to heat generated by said resistor during moderate power surge conditions so that the solder of at least one of said links melts permitting said resistor to be pushed away from said terminals by said biasing means to thereby create an open circuit condition.

2. The device of claim 1 wherein said terminals are configured external of said housing for surface mounting to the circuit board utilizing solder reflow technology.

3. The device of claim 2 wherein the melting point of the solder forming said connecting links is higher than the melting point of the surface mount solder.

4. A printed circuit board including the device of claim 2 surface mounted thereon with a surface mount solder having a melting point less than the melting point of the solder forming said connecting links.

5. The combination of claim 1 further including a holder (H) for holding the device housing, said holder having means for mechanically and electrically connecting said device to a circuit board.

6. A device that is mountable on a telephone central office line card for protecting the central office from first and second level lightning and power cross conditions occurring on wires connecting the line card to subscriber equipment, said device comprising:

a housing;

a fusible surge rated resistor contained within said housing;

a heat sink associated with said fusible surge rated resistor providing a thermal mass for absorbing heat generated by said resistor;

a pair of terminals for connecting said fusible surge rated resistor to a line card so that the resistor is in series with a tip line or ring line, each said terminal extending through said housing so that it connects to said resistor internal of the housing and provides a surface external to the housing for adherence to a line card;

connecting links formed of a solder of known melting point joining said terminals to said resistor;

means for applying a force that biases said resistor away from said terminals;

said fusible surge rated resistor having a chosen resistive value serving to limit the line current under normal operating conditions;

said heat sink having sufficient heat absorbing and heat dissipating characteristics such that during low level lightning and power cross conditions the resistor may continue to operate without significant change to its electrical characteristics;

the resistance material of said fusible surge rated resistor and the configuration thereof providing electro-thermal characteristics enabling the resistor to absorb the lightning conditions and continue to operate without significant change to its electrical characteristics, yet fuse open to create an open circuit condition for high level power-cross conditions; and said connecting links being responsive to heat generated by said resistor during moderate overcurrent conditions so that the solder of at least one of said links melts permitting said resistor to be pushed away from said terminals by said biasing means to thereby create an open circuit condition.

7. A device that is surface mountable on a telephone central office line card for protecting the central office from first and second level lightning and power cross conditions occurring on wires connecting the line card to subscriber equipment, said device comprising:

a housing;

a fusible surge rated resistor contained within said housing;

a heat sink associated with said fusible surge rated resistor providing a thermal mass for absorbing heat generated by said resistor;

a pair of terminals for connecting said fusible surge rated resistor to a line card so that the resistor is in series with a tip line or ring line, each said terminal extending through said housing so that it connects to said resistor internal of the housing and provides a surface external to the housing for adherence to a line card using solder-reflow surface mounting technology with the solder used for surface mounting having a known melting point B;

connecting links formed of a solder of known melting point A joining said terminals to said resistor;

the melting point B of said surface mount solder being less than the melting point A of said connecting links;

means for applying a force that biases said resistor away from said terminals;

said fusible surge rated resistor having a chosen resistive value serving to limit the line current under normal operating conditions;

said heat sink having sufficient heat absorbing and heat dissipating characteristics such that during lightning and low level power cross conditions the resistor may continue to operate without significant change to its electrical characteristics;

the resistance material of said fusible surge rated resistor and the configuration thereof providing electro-thermal characteristics enabling the resistor to absorb the lightning conditions and continue to operate without significant change to its electrical characteristics, yet fuse open cleanly to create an open circuit condition for high level power-cross conditions; and said connecting links being responsive to heat generated by said resistor during moderate overcurrent conditions so that the solder of at least one of said links melts permitting said resistor to be pushed away from said terminals by said biasing means to thereby create an open circuit condition.

8. The device of claim 7 wherein said terminals include a neck-down position to thermally isolate said resistor from the circuit board.

9. The device of claim 8 wherein said terminals include an area of reduced cross section in the thermal transfer path between the resistor and the external surfaces of the terminals where the terminals adhere to a line card.

10. The device of claim 7 further including a holder (H) for holding the device housing, said holder having means for mechanically and electrically connecting said device to a line card.

11. A device that is surface mountable on a telephone central office line card for protecting the central office from first and second level lightning and power cross conditions occurring on wires connecting the line card to subscriber equipment, said device comprising:

a housing;

a fusible surge rated wire-wound resistor contained within said housing;

said resistor having a non-conductive core providing a thermal mass for absorbing heat generated by said resistor;

a pair of terminals for connecting said fusible surge rated resistor to a line card so that the resistor is in series with a tip line or ring line, each said terminal extending through said housing so that it connects to said resistor internal of the housing and provides a surface external to the housing for adherence to a line card using solder-reflow surface mounting technology with the solder used for surface mounting having a known melting point B;

connecting links formed of a solder of known melting point A joining said terminals to said resistor;

the melting point B of said surface mount solder being less than the melting point A of said connecting links;

means for applying a force that biases said resistor away from said terminals; and said fusible surge rated resistor having a chosen resistive value serving to limit the line current under normal operating conditions and having electro-thermal characteristics in conjunction with the thermal characteristics of said resistor core such that during lightning and low level power cross conditions the resistor continues to operate without significant change in its electrical characteristics, and during moderate power cross conditions the resistor generates sufficient heat to turn the solder molten of at least one of said connecting links to thereby permit the resistor to be pushed away from said terminals by said biasing means to thereby create an open circuit condition, and during high level power cross conditions the resistor fuses open cleanly.

12. A device that is mountable on a circuit board for protecting the circuit board from various levels of power surge conditions, said device comprising:
- a housing defining first and second chambers and a partition between the chambers;
- a fusible surge rated resistor and associated heat sink in said first chamber;
- a pair of terminals secured by meltable solder to said resistor, said terminals providing surfaces external of said housing facilitating mechanical and electrical connection of said device to a circuit board; and
- a spring in said second chamber biasing said resistor away from said terminals.

* * * * *